July 22, 1958 — T. N. SCOVILLE — 2,844,187
VIBRATION FREE SUPPORT
Filed Oct. 23, 1956
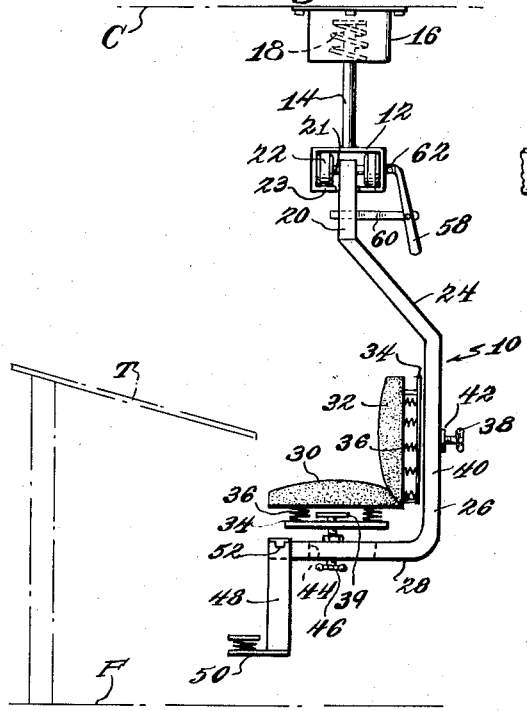
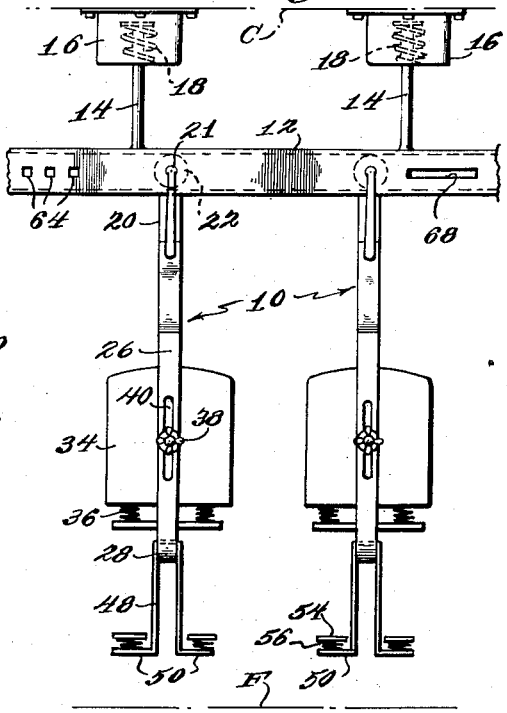
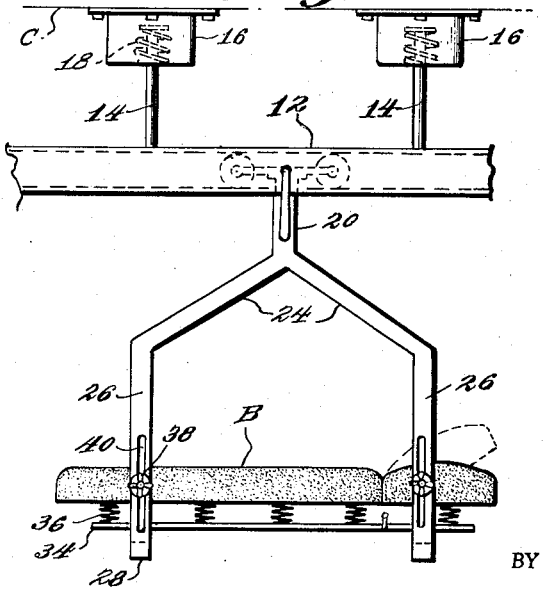
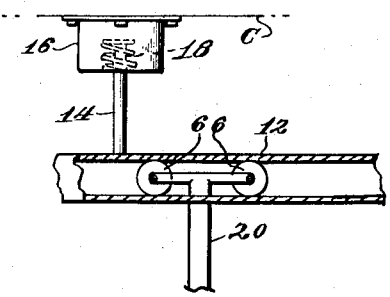
INVENTOR
THOMAS N. SCOVILLE,
BY Raymond N. Matson
HIS AGENT

2,844,187

VIBRATION FREE SUPPORT

Thomas Nesbit Scoville, Reading, Pa.

Application October 23, 1956, Serial No. 617,836

10 Claims. (Cl. 155—51)

This invention relates generally to supporting devices and more particularly to supports for seats, reclining and other devices, etc., which completely eliminate the various types of vibration which are normally transmitted thereto.

As is well known, there are two types of vibrations—natural such as are produced by an earthquake, and artificial or those emanating from man-made devices. Aside from a relatively few valuable uses, vibrations and their effects are extremely undesirable insofar as either machines or human beings are concerned.

The health and efficiency of human beings are seriously impaired by the cumulative effects of the various vibrations transmitted to the body as is clearly evidenced by nervous breakdowns and extreme fatigue traceable thereto, and by the markedly lower production of a worker.

Much vibration is caused by streetcars, subways, elevated trains, ordinary traffic, and noises and these are ultimately transferred to the individual through the pavements, the steel structure of buildings, the floors, etc. Thus, the individual's health and efficiency depends to a large extent upon the ability to exclude all or as much of the vibrations as is practicable.

Accordingly, the chief object of the present invention is to provide an improved apparatus for eliminating the transmission of vibrations to individuals, or to objects supported thereby.

Another important object of the present invention is to provide an improved means for supporting seats, reclining devices such as couches, etc., and other objects in such a manner as to eliminate the transmission of vibrations thereto.

A further important object of the present invention is to provide an improved vibration-free seating or reclining device which is adjustable to fit the posture of any individual and which is adaptable for use in the home, office or in any location where vibrations are undesirable.

A still further important object of the present invention is to provide a vibration free supporting means which is simple and economic of manufacture and rugged and of long life in use.

Other objects and advantages of the present invention will become apparent during the course of the following description.

In the drawings, I have shown two embodiments of the invention. In these showings:

Figure 1 is a side elevational view of the invention, parts being shown in section;

Figure 2 is a rear elevational view thereof;

Figure 3 is a fragmentary view similar to Figure 2 showing a slightly modified form of the invention, and Figure 4 is a view similar to Figure 2 of another embodiment of the invention.

Referring to the drawings, numeral 10 indicates as a whole the novel vibration eliminating, supporting device comprising the present invention.

As shown, an inverted U-shaped channel 12 forming a monorail is supported at spaced points from a ceiling, etc. C by means of a plurality of hanger bolts 14 which depend from within hanger boxes 16 where they are resiliently supported on compression springs 18.

A frame member 20 depends from the channel or monorail 12 and is mounted for rolling movement with respect thereto by a stub axle 21 including a pair of rollers 22 mounted on the opposite ends thereof which track on the internal flanges 23. It will be noted that the diameter of the wheels 22 is just slightly less than the vertical height of the monorail 12 so that movement of the supporting device 10 as a whole about the center of the axle 21 as a center is prevented. This insures stability in a fore and aft or left to right direction as seen in Figure 1.

The frame member 20 includes a rearwardly inclined portion 24, a vertical portion 26 and a forwardly directed, horizontal portion 28. As is evident, any loads placed on the frame 28 will be substantially at the center of gravity of the supporting device 10 as a whole.

As shown in Figures 1–3 inclusive, the device 10 supports seating means comprising a seat 30 and a back rest 32 which have different surface contours and are interchangeable to readily conform to the different postures of users. Both the seat and the back are mounted on flat plates 34 by means of a plurality of compression springs 36 and the plates are adjustably supported on the frame members 26 and 28 by worm screws 38 and 39 respectively.

The worm screw 38 is mounted in a slot 40 wherein it may be clamped by a nut 42 after the back rest 32 has been adjusted to the proper vertical height. Forward and rearward adjustment is effected by the worm screw 38. Similarly, the worm screw 39 which adjusts the vertical position of the seat, is mounted in a slot 44 for frontward and rearward adjustment and is fixed in position by a clamp nut, etc. 46.

The feet of the occupant of the seating device are maintained out of contact with the floor or ground F by means of an inverted U-shaped, rigid strap 48 of any desired material having outturned and forwardly projecting foot supports 50. The strap 48 is detachably supported on the forward end of the frame member 28 and detained there by a depending lug 52 which engages in a recess in the frame. As shown in Figure 2, the supports 50 are preferably provided with wear plates 54 supported by vibration cushioning or eliminating members 56.

The supporting device 10 may be locked in any desired position along the monorail 12 by means of a locking lever 58 pivotally connected to the frame 20 by a bracket 60. The lever 58 is provided as an enlarged square head which is adapted to be received in any one of a plurality of closely fitting square apertures 64 formed in the side of the monorail 12. The lever 58 may be retained in locked position by gravity as shown or by resilient means.

It is to be noted that the engagement of the square locking head 62 in the square apertures 64 prevents rocking of the supporting device from side to side about its supporting pair of rollers 22. As shown in Figures 3 and 4 this lateral stability may be further ensured, if desired, by the use of a double pair of supporting rollers 66.

As shown in Figures 1 and 2, one or more of the seating devices may be conveniently arranged adjacent tables or disks T for the normal conduct of work, etc. In applications where it is desirable that the seating device be moveable laterally within specified limits, as in the case of a draftsman—the monorail 12 is provided with an elongated slot 68 which permits limited lateral movement while ensuring the stability of the supporting device 10 as a whole.

A modified form of the invention is disclosed in

Figure 4 which comprises a couch or bed B rather than seating means. The structure otherwise differs in that the frame is doubled below the member 20 to provide spaced, parallel, duplicate frame members 24, 26, and 28. Instead of the bed B, the device 10 could, of course, support a table or base for delicate machinery, or other objects.

It will now be readily apparent that the device 10 completely eliminates the transmission of vibrations regardless of their intensity between adjacent buildings, etc. and the person or object supported due to the spring mounting of the monorail and the spring mounting of the seating or reclining means, etc.

The latter mounting is important in those applications when the frequencies of the various harmonies of the vibrations should attain resonance resulting in a brief but possibly abrupt movement of the monorail. Thus, the vibrationless supporting device 10 is admirably suited for practical use in the material reduction of fatigue in hospitals, doctor's and other offices, factories, etc. The monorail may be of any length and curved if desired to accommodate the device 10 for maximum use in a single or plurality of rooms with the decor of which it may be readily made to conform.

It is to be understood that the forms of the invention herewith shown and described are to be taken as preferred examples of the same and that various changes in the shape, size and arrangement of parts may be resorted to without departure from the spirit of the invention or the scope of the subjoined claims.

I claim:

1. An apparatus for providing a vibration free support comprising a plurality of hangar boxes adapted to be fixed to an overhead support at spaced points, a spring mounted in each of said boxes, a track suspended from said springs, a frame including wheels mounted on said track for movement therealong, and a member including a supporting surface mounted on said frame beneath the wheels, and resilient means interposed between and connecting said member and said frame.

2. An apparatus as recited in claim 1 wherein said supporting surface comprises seating means.

3. An apparatus as recited in claim 2 wherein feet supporting means are mounted on said frame.

4. An apparatus as recited in claim 1 wherein said supporting surface comprises reclining means.

5. An apparatus as recited in claim 1 wherein said supporting surface is movable horizontally with respect to said frame.

6. An apparatus as recited in claim 1 wherein said supporting surface is movable vertically with respect to said frame.

7. An apparatus as recited in claim 1 wherein said supporting surface is movable horizontally and vertically with respect to said frame.

8. An apparatus as recited in claim 1 wherein said frame includes locking means for preventing movement of said frame with respect to said track.

9. An apparatus as recited in claim 8 wherein said track includes spaced apertures and said locking means comprises a head adapted to closely fit one of said apertures.

10. An apparatus as recited in claim 9 wherein one of said apertures comprises an elongated slot to permit limited movement of said frame along said track.

References Cited in the file of this patent

UNITED STATES PATENTS

| | | |
|---|---|---|
| 338,895 | Weeden | Mar. 30, 1886 |
| 692,505 | Crutchfield | Feb. 4, 1902 |
| 894,229 | Prouty | July 28, 1908 |
| 1,006,954 | Krzewinski et al. | Oct. 24, 1911 |
| 1,417,744 | Kent | May 30, 1922 |
| 2,322,642 | Jones | June 22, 1943 |
| 2,589,803 | Haley | Mar. 18, 1952 |

FOREIGN PATENTS

| | | |
|---|---|---|
| 699,317 | Germany | Nov. 27, 1940 |